United States Patent Office 3,803,195
Patented Apr. 9, 1974

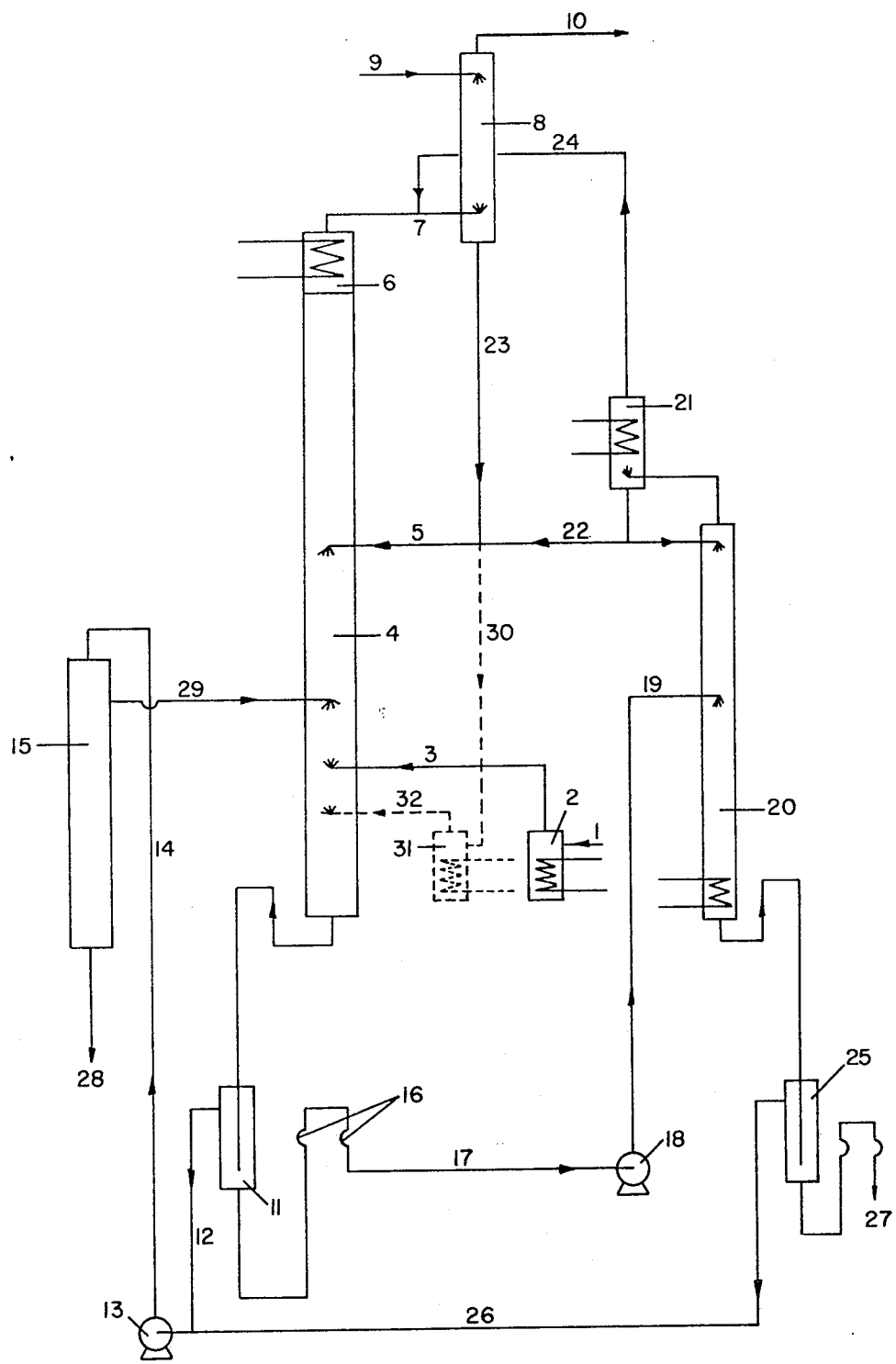

3,803,195
PROCESS FOR THE PRODUCTION OF
ORGANOSILOXANES
Siegfried Nitzsche and Rudolf Strasser, Burghausen, Germany, and Helmut Spork, Altotting, Austria, assignors to Wacker Chemie GmbH, Munich, Germany
Filed Sept. 22, 1972, Ser. No. 291,464
Claims priority, application Germany, Sept. 29, 1971,
P 21 48 669.1
Int. Cl. C07f 7/08, 7/18
U.S. Cl. 260—448.2 E    7 Claims

ABSTRACT OF THE DISCLOSURE

An improved process for the production of organosiloxanes and alkyl halides which comprises passing organohalosilanes and organic compounds of the general formula ROR', wherein R is an alkyl radical and R' is a hydrogen atom, alkyl or acyl radical, through a reactive zone containing packing material having a surface area of at least 0.1 m.²/g.

---

The invention relates to a process for preparing organosiloxanes and more particularly to an improved process for preparing organosiloxanes and alkyl halides.

It is well known that organohalosilanes readily hydrolyze when mixed with water to form hydrogen halides and silanols which condense or can be caused to condense to form organosiloxanes. However, when organopolysiloxanes are prepared by reacting organohalosilanes with organic compounds of the general formula ROR' where R is an alkyl radical and R' is a hydrogen atom or an alkyl or acyl radical, alkyl halides are formed as by-products. Alkyl halides are considerably more valuable than hydrogen halides, since these alkyl halides can be reacted with silicon to form organohalosilanes.

Heretofore organopolysiloxanes have been prepared by contacting a dialkyldihalosilane and a lower alcohol in the vapor phase with a silica gel treated zinc halide catalyst at temperatures of from about 175° to 400° C. (German patent application No. 1,007,063 and British Patent No. 818,305). Organopolysiloxanes have also been prepared by reacting dimethyldichlorosilane with methanol or dimethyl ether in a ZnCl₂/KCl-melt as described by W. Sundermeyer in Chemische Berichte, vol. 97 (1964), pp. 1068-1074.

The present invention has several advantages over the processes described heretofore. For example, higher yields of organopolysiloxanes and alkyl halides are obtained at lower temperatures. In addition, corrosion of the processing equipment is substantially reduced and less energy is required when the reaction is conducted at these lower temperatures. Also in the prior processes, some cleavage of the SiC-bonds occurred, thereby reducing the quality of the organopolysiloxanes formed. Also the products resulting from the cleavage of the SiC-bonds coated the catalyst surface, which resulted in a substantial reduction in the efficiency of the process. However, in the instant process cleavage of SiC-bonds have been substantially reduced and even in some cases avoided. Furthermore, the present process provides higher yields of alkyl halides which may likewise be reacted with a silicon to form additional organohalosilanes. Still another advantage of this process is that the alcohols and/or their derivatives do not need to be entirely anhydrous and thus may contain up to 10 percent by weight of water without interferring with the process or substantially lowering the yield of alkyl halides.

It is therefore, an object of this invention to provide a process for preparing organopolysiloxanes. Another object of this invention is to provide a process for preparing organopolysiloxanes in which an alkyl halide is the by-product. Still another object of this invention is to provide a process for preparing organopolysiloxanes at lower reaction temperatures. A further object of this invention is to provide a process for preparing organopolysiloxanes in which the cleavage of SiC-bonds is substantially eliminated. A still further object of this invention is to provide a process for preparing organopolysiloxanes in which the alcohol and/or the alcohol derivative may contain up to 10 percent by weight of water without substantially affecting the yield of alkyl halides.

The foregoing objects and others which will become apparent from the following description are accomplished in accordance with this invention, generally speaking, by providing a method for preparing organopolysiloxanes and alkyl halides which comprises passing organohalosilanes and organic compounds of the general formula ROR' in which R is an alkyl radical having up to 4 carbon atoms and R' is a hydrogen atom or an alkyl or acyl radical having up to 4 carbon atoms, countercurrently through a zone maintained at a temperature of from 20° to 150° C. and containing solid packing materials having a surface area of at least 0.1 m.²/g.

The process of this invention is applicable to all organohalosilanes which could be used in the preparation of organopolysiloxanes by passing the organohalosilanes and compounds of the general formula ROR', where R and R' are the same as above, through a zone containing solid packing materials. Halosilanes which contain at least 90 percent by weight of organosilicon compounds and have the silicon valences bonded to 1 or 2 halogen atoms and contain at least 1 organic moiety having a SiC-bond, can be used as the organohalosilanes. The organosilanes may be further represented by the general formulae

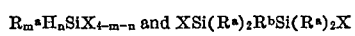

in which X is a halogen atom such as chlorine, bromine or iodine, preferably chlorine, $R^a$ is a monovalent hydrocarbon radical or a substituted monovalent hydrocarbon radical, $R^b$ is a divalent hydrocarbon radical or a substituted divalent hydrocarbon radical, $m$ is a number of from 1 to 3, preferably 2, $n$ is a number of from 0 to 1 and the sum of $m+n$ is 2 or 3.

Examples of suitable hydrocarbon radicals represented by $R^a$ are alkyl radicals, having up to 18 carbon atoms such as methyl, ethyl, propyl, butyl, hexyl, octyl, octadecyl groups; cycloalkyl radicals such as the cyclohexyl radical; alkenyl radicals such as vinyl and alkyl radicals; cycloalkenyl radicals such as the cyclohexenyl radical; and aryl radicals such as phenyl and the like.

It is obvious that substituted hydrocarbon radicals $R^a$ and $R^b$ can only comprise those which do not lead to cross linking on a large scale under the reaction conditions of this invention. Examples of substituted hydrocarbon radicals $R^a$ are especially haloalkyl radicals, where the halogen atom is in the alpha and/or gamma position to the silicon atom, such as the 3,3,3-trifluoropropyl radical, and halo-substituted aryl radicals. Examples of suitable alkylene hydrocarbon radicals represented by $R^b$ having up to 10 carbon atoms are methylene, ethylene, tetramethylene, octamethylene and phenylene radicals.

Dimethylsiloxane units represent the major proportion of the organosiloxane units in the large volume manufacture of organopolysiloxane products, such as organopolysiloxane elastomers and diorganopolysiloxanes having trimethylsiloxy terminal groups. Since chlorine is readily available, the preferred organohalosilane used in the process of this invention is dimethyldichlorosilane. It is obvious that other organosilicon compounds in which the silicon atom has 1 or 2 halogen atoms bonded thereto and also contain at least 1 organic moiety bonded by SiC-bond, may be used together with the dimethyldichlorosilane as organohalosilanes within the scope of this invention. Examples of other organosilicon compounds are vinylmethyldichlorosilane, phenylmethyldichlorosilane, divinyldichlorosilane, diphenyldichlorosilane, methyldichlorosilane, trimethylchlorosilane, and vinyldimethylchlorosilane.

Silicon tetrachloride and methyltrichlorosilane are examples of other halosilanes which may be present in addition to the organosilicon compounds described above. Generally these are present in an amount up to 10 percent by weight based on the total weight of the silanes used in the process of this invention. These halosilanes also have 1 or 2 halogen atoms bonded to the silicon atom and at least 1 organic moiety with a SiC-bond. Silanes containing more than 2 halogen atoms per molecule should be avoided; however, they often are present as impurities. Silanes having more than 2 halogen atoms per molecule should not be present in more than 10 percent by weight since they will lead to highly cross-linked organopolysiloxanes which tend to plug the equipment used in the process of this invention.

Suitable examples of compounds having the general formula ROR′, are alcohols having from 1 to 4 carbon atoms such as methanol, ethanol, propanols, n-butanol and 2-butanol; dialkylethers having from 1 to 4 carbon atoms per alkyl radical, such as dimethyl ether and diethyl ether; and alkanoic acid alkyl esters, such as methyl acetate and ethyl acetate. Methanol is the preferred alcohol since it is readily available. Methyl chloride which is the resulting by-product of this reaction is the preferred alkyl halide since it may be used, for example, in the synthesis of dimethyldichlorosilane.

Mixtures of various compounds of the formula ROR′ may also be used. The process of this invention, thus presents a very good opportunity to utilize a mixture containing equal molar parts of methanol and methyl acetate. This mixture is a by-product, for example in the production of polyvinyl alcohol by transesterification.

Although the ratio of organohalosilane to organic compound ROR′ is not critical, it is preferred that from 1.0 to 1.75 moles and more preferably about 1 mole of organic compound be employed per gram atom of halogen in the silane when the organic compound is an alcohol and/or an ester. When the organic compound (ROR′) is an ether, then it is preferred that from 0.5 to 0.8 mole and more preferably about 0.5 mole of the organic compound be employed per gram atom of halogen in the silane. Generally, it is desirable that there be an excess of the organic compound (ROR′) in contact with the packing materials while the reactants are being passed through the zone containing the packing. Any unreacted material having the general formula ROR′ which is recovered from the reaction can be recycled.

The packing materials must be essentially inert and acid-resistant. Examples of suitable packing materials are carbon base substances such as granulated activated charcoal of synthetic, animal, or plant origin and pressed graphite material such as graphite rings. Additional examples of packing materials used in the process of this invention are granulated diatomaceous earths, sintered powders of polyolefins and/or other acid resistant synthetic resins, porous ceramic particles as well as silicon dioxide (see for example H. Rompp "Chemie-Lexikon," 6th ed., Stuttgart 1966, columns 5915/5916).

Although the surface area of the packing materials is preferably 1.0 m.²/g., there is no upper limit. Packing materials having a surface area of approximately 1200 m.²/g. gave very good results. Catalytic agents such as Lewis-acids, for example $ZnCl_2$, or sulfuric acid, and/or other catalytic agents such as cation exchange resins in the H-form may be used with the packing materials. However, use of such materials is not desirable and should be avoided since these materials tend to promote the cleavage of SiC-bonds.

The values for the surface area of the packing materials are determined in accordance with the BET-method (see Brunauer, Emmet and Teller in "Journal of the American Chemical Society," vol. 60, pp. 309).

In order to facilitate passage of the reactants through the zone containing the packing materials and/or to avoid abrasion of the packing materials, it is useful to use packing materials having a surface area of at least 0.1 m.²/g. in combination with materials having a surface area less than 0.1 m.²/g., for example, glass Raschig rings. Alternatively, mixtures of several packing materials having a surface area of at least 0.1 m.²/g. may be used, such as mixtures of a granulated activated charcoal and graphite rings. Mixtures of these packing materials may be used in combination with packing materials having a surface area of less than 0.1 m.²/g.

The amount of packing materials having a surface area of at least 0.1 m.²/g. should be at least 50 volume percent based on the total volume of the reactants and the reaction products in contact with the packing materials.

It is preferred that the packing materials zone be kept at a temperature of from 50° to 100° C. At temperatures below about 20° C. the reaction is extremely slow, whereas, temperatures above 150° C. may be detrimental to the quality of the product, for example, through cleavage of the SiC-bonds.

The process of this invention can be conducted in a tubular reaction vessel. It is important that the reactants be passed countercurrently through the reaction vessel. The entry ports for the introduction of the organohalosilane and compounds of the formula ROR′ should be separated by at least 20 cm. The tubular reaction vessel may be designed as a conventional reaction tower.

If the reaction vessel is a reaction tower, the compound having the formula ROR′, when in the liquid state is preferably introduced above the entry port for the organohalosilane and if in the gaseous state, it is preferably introduced below the entry port for the organohalosilane. The organosiloxane is drawn off at the bottom of the tower.

The process is preferably carried out at ambient pressure, that is, 760 mm. Hg (absolute) or approximately 760 mm. Hg (absolute), since there is no need for pressure and corrosion-resistant equipment. If it is desired, the process may be carried out at elevated or reduced pressures.

The process of this invention may be carried out as a batch process, as a semi-continuous, or as a continuous process. It is preferred that it be carried out as a continuous process, thereby making it possible to use small sized equipment and thus a small capital outlay.

Apart from the starting materials, such as organohalosilanes and compounds of the general formula ROR′, the process requires no solvents or other carriers when the organohalosilanes are liquids or gases at the temperatures at which the packing zone is maintained.

Only minor amounts of aqueous hydrogen halides are formed as by-products in addition to the organosiloxanes and alkyl halides. A quantitative yield of organosiloxanes may be achieved and the yield of alkyl halides may exceed 93 percent of theory.

Linear and/or cyclic organopolysiloxanes may be produced by the process of this invention. If exclusively linear organopolysiloxanes are desired, it is practical to recycle into the reaction vessel cyclic organopolysiloxanes which have been separated from the organopolysiloxane mixture as it is removed from the reaction vessel. Where cyclic organopolysiloxanes are desired, the linear organopolysiloxanes which have been separated from the organopolysiloxane reaction mixture are recycled through the reaction vessel.

According to the following stoichiometry a linear dimethylpolysiloxane containing an average of 80 dimethylsiloxane units, and having a uniform viscosity, as well as cyclic dimethylpolysiloxanes, is obtained if the following preferred conditions are employed in the process of this invention. The zone of packing materials is maintained at or about 60° C. and at a pressure of about 700 mm. Hg (absolute). Dimethyldichlorosilane is employed as the organohalosilane and methanol is used as the compound having the formula ROR'. An excess of methanol is constantly in contact with the packing materials as long as dimethyldichlorosilane is passed through the reaction vessel.

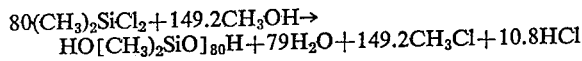

$$80(CH_3)_2SiCl_2 + 149.2 CH_3OH \rightarrow HO[(CH_3)_2SiO]_{80}H + 79 H_2O + 149.2 CH_3Cl + 10.8 HCl$$

The viscosity of the resulting alpha, omega-dihydroxydimethylpolysiloxane polymer is such that it can be readily pumped and at the same time is suitable for processing with the customary condensation catalysts, such as phosphoronitrilochlorides, to form higher molecular weight dimethylpolysiloxanes for the production of elastomers without requiring precondensation before further processing.

Another advantage of the process of this invention is that hydrogen halide in which the halogen is the same as the one used in the organohalosilane may be introduced into the reaction vessel, that is, into the zone containing the packing materials, along with the organohalosilane and the compound of the formula ROR', and if desired recycled cyclic or linear organopolysiloxanes, respectively, to form additional alkyl halides. Preferably this hydrogen halide is gaseous and according to the most desirable method, is mixed with the compound having the formula ROR'. Thus it is advantageous to introduce for example, hydrogen chloride dissolved in methanol into the reaction vessel. This process provides a means for using hydrogen chloride which heretofore was difficult to utilize.

The invention will now be described in connection with the accompanying drawing which shows diagrammatically by means of a flow plan an arrangement of apparatus for practicing the invention together with certain modifications thereof. The description of the invention in connection with the drawing will serve to exemplify the same.

With reference to the drawing, liquid dimethyldichlorosilane is introduced into vaporizer 2 through pipe 1. The vaporized dimethyldichlorosilane is introduced into the reaction tower 4 through pipe 3. The reaction tower 4 is filled with packing materials having a surface area of at least 0.1 m.²/g.

Liquid methanol is introduced into the reaction tower 4 through pipe 5. Gaseous unreacted methanol is condensed in a dephlegmator 6 located in the upper end of the reaction tower 4. The condensate returns to the reaction tower 4. Methyl chloride which is produced as a result of the reaction in reaction tower 4 together with uncondensed methanol is passed into scrubber 8 from dephlegmator 6 via pipe 7. There it is washed with fresh methanol from pipe 9 and the washed methyl chloride is transferred from scrubber 8 via pipe 10 to a condenser unit (not shown).

The product exiting from the lower portion of the tower 4 will phase separate in phase separator 11 into an upper phase, consisting mainly of dimethylpolysiloxane and into a lower phase consisting mainly of water and unreacted liquid methanol.

Dimethylpolysiloxane from separator 11 is transferred to a distillation unit 15 via pipe 12, pump 13 and pipe 14. In this distillation unit, the volatile compounds will be separated from the non-volatile linear polysiloxanes by means of extraction distillation with steam at 112° C. at approximately 700 mm. Hg (absolute). These volatile compounds include the low boiling dimethylpolysiloxanes, consisting mainly of cyclic dimethylpolysiloxanes and hydrogen chloride (approximately 1 g./l. dimethylpolysiloxane) and methanol which was partly dissolved in the dimethylpolyosiloxane and was partly formed through cleavage of methoxy groups of the dimethylpolysiloxanes (a total of 2.5 g./l. dimethylpolysiloxane).

The linear dimethylpolysiloxanes are removed through pipe 28 and the cyclic dimethylpolysiloxanes are recycled to reaction tower 4 via pipe 29 after being separated from acid, water and methanol in a separating unit (not shown).

The lower phase from separator 11 is transferred to the distillation unit 20 via the variable interphase level controller 16, pipe 17, pump 18 and pipe 19. Methanol contained in the gaseous product from the upper portion of the distillation unit 20, which may contain 10 percent by weight of water based on the weight of methanol, is condensed in condenser 21. The condensate will flow through pipe 22, where it is mixed with the methanol from scrubber 8 via pipe 23 and returned to the reaction tower 4 via pipe 5. The non-condensibles from condenser 21 are introduced into pipe 7 upstream of scrubber 8 via pipe 24. The bottom product exiting from the lower part of the distillation unit 20 will separate in phase separator 25 into an upper layer of dimethylpolysilane and into a lower layer of approximately 20 percent by weight of aqueous hydrogen chloride.

Dimethylpolysiloxane from phase separator 25 is pumped into the distillation unit 15 via pipe 26, pump 13 and pipe 14, together with dimethylpolysiloxane from phase separator 11. The aqueous hydrochloric acid is removed from phase separator 25 via pipe 27.

Where methanol is used in the vapor state, pipes 22 and 23 are connected to pipe 30 rather than pipe 5. Methanol is vaporized in vaporizer 31 and the vaporized methanol is passed into the reaction tower 4 via pipe 32.

The embodiments of this invention are further illustrated by the following examples in which all percents are by weight unless otherwise specified.

EXAMPLE I

With reference to the drawing, reaction tower 4 consists of three vertical glass tubes, which are connected by ground glass joints. On top sits a glass condenser which serves as dephlegmator 6. The reaction tower 4 has a height of 3060 mm. and an I.D. of 55 mm. It is surrounded by a heating mantle. Granulated activated charcoal having a surface area of approximately 1150 m.²/g. is used as the packing material inside the tower. It extends from 400 mm. above the lower end of the tower to 140 mm. below the upper end of the tower. Connecting zones between the glass tubes comprising the tower are free from activated charcoal. The total length of the three zones filled with activated charcoal is 1710 mm. The packing material is supported by sieve trays.

The tower is filled with liquid methanol from pipes 9 and 23 via pipe 5 which leads into the tower 4 at a position 1740 mm. above the lower end of tower 4. The contents of the tower are heated to 60° C. by means of a heating mantle. Liquid methanol is introduced into the tower via pipe 5 until a constant stream circulates in pipes 7, 23 and 5, and phase separator 11, respectively; pipes 17 and 19 and the distillation unit 20 and pipes 22 and 5. Liquid dimethyldichlorosilane is then passed into vaporizer 2 via pipe 1. The vaporized dimethyldichlorosilane is passed into reaction tower 4 via pipe 3. Pipe 3 enters tower 4 at a position 620 mm. above the lower end of the tower 4. Methanol addition through pipe 5 is then regulated at 2 moles of methanol per mole of dimethyldichlorosilane.

Two hours after the initial addition of dimethyldichlorosilane, methyl chloride will reach the countercurrent scrubber 8 via the dephlegmator 6 and pipe 7. Scrubber 8 consists of a tube 1000 mm. in eight and an I.D. of 24 mm. It has a cooling mantle which is operated with water at 12° C. and is packed with Raschig rings of 6 x 6 mm. Pipe 7 enters scrubber 8 100 mm. above the lower end of the washer. Methyl chloride, which has been washed with fresh methanol from pipe 9 passes from scrubber 8 via pipe 10, to a condensation unit. After steady state conditions have been reached, 155 ml./hour. liquid methyl chloride with less than 1 mg./l. hydrogen chloride is obtained.

The product from the lower part of the tower 4 will separate into two phases in phase separator 11. A vertical pipe 700 mm. in height and an I.D. of 55 mm. comprises the phase separator. The pipe in which the product from the lower part of tower 4 is transferred into phase separator 11, terminates 500 mm. above the bottom of the phase separator.

Dimethylpolysiloxanes from the upper phase of the phase separator 11 is transferred to the distillation unit 15 via pipe 12, which is 600 mm. above the bottom of phase separator 11, via pump 13 and pipe 14. The cyclic dimethylpolysiloxanes from this distillation unit are returned to tower 4 via pipe 29. Pipe 29 enters tower 4 at a position 870 mm. above the lower end of the tower. When steady state is reached, 123 ml./hour. of alpha-omega-dihydroxydimethylpolysiloxanes having a viscosity of approximately 120 cs. at 25° C. are obtained. The dimethylpolysiloxanes contain less than 1 mg./l. hydrogen chloride and show a weight loss of 0.25 percent after heating to 250° C. for two hours.

The lower phase from phase separator 11, which consists primarily of a mixture of methanol and water is transferred to distillation unit 20 via the variable interphase level controller 16, pipe 17, pump 18 and pipe 19. A vertical pipe is used as distillation unit 20. This pipe has a height of 1000 mm. and has an I.D. of 55 mm. It is packed with Raschig rings of 4 x 4 mm. and has a plated vacuum jacket. Pipe 19 enters approximately in the center between the lower and the upper half of pipe 20. Evaporation of the volatile products is achieved by means of a rotary evaporator. The gaseous products from the upper part of pipe 20 are passed into intensive cooler 21. The condensate, consisting of methanol, is taken overhead through a reflux splitter with magnetic control and a reflux ratio of 1:6.6. It will pass through pipe 22, where it is mixed with methanol from scrubber 8 via pipe 23, and returned to reaction tower 4 via pipe 5. The phase separator 25 for the product from the lower part of pipe 20 is a vertical pipe 300 mm. in length and an I.D. of 400 mm.

A steady state is achieved after 24 hours. At that point 206 ml./hour liquid methanol is fed to the unit via pipe 9 and a total of 520 ml./hour methanol is circulating in the system.

After operating for 72 hours, the following material balance was obtained in a typical 24 hours run:

|  | Milliliters | Grams | Moles |
| --- | --- | --- | --- |
| Reactants: |  |  |  |
| Dimethyldichlorosilane (liquid) | 4,840 | 5,240 | 40.6 |
| Methanol (liquid) | 3,285 | 2,595 | 81.4 |
| Mole ratio app. 1:2. |  |  |  |
| Reaction products: |  |  |  |
| Dihydroxydimethylpolysiloxane, yield: 98% of theoretical | 2,955 | 2,900 | 39.6 |
| Methyl chloride, yield: 93.7% of theoretical | 3,720 | 3,840 | 76.1 |

EXAMPLE II

The method of operation as described in Example I is repeated with the unit as described therein except that a mixture of 97.4 percent dimethyldichlorosilane and 2.56 percent trimethylchlorosilane is substituted for the pure dimethyldichlorosilane. A steady state is reached after 24 hours. The following amounts are then fed into the unit: 255 ml./hour of liquid organochlorosilane mixture via pipe 1 and 180 ml./hour of liquid methanol via pipe 9. 192 ml./hour of liquid methyl chloride is obtained along with 150 ml./hour of a trimethylsiloxy-terminated dimethylpolysiloxane having an average molecular weight of about 4000. After removing traces of activated charcoal by filteration, the oil is ready for commercial use. It may be used as oil for shock absorbers or as plasticizers for organopolysiloxane elastomers.

After operating for 96 hours, the following material balance was obtained in a typical 24 hour run:

|  | Milliliters | Grams | Moles |
| --- | --- | --- | --- |
| Reactants: |  |  |  |
| Organochlorosilane mixture (liquid) | 6,120 | 6,500 | 50.6 |
| Methanol (liquid) | 4,320 | 3,430 | 106 |
| Mole ratio 1:2.1. |  |  |  |
| Reaction products: |  |  |  |
| Organopolysiloxanol, yield: 98.5% of theoretical | 3,740 | 3,680 | 49.5 |
| Methyl chloride, yield: 93.5% of theoretical | 4,608 | 4,750 | 94 |

EXAMPLE III

The method of operation as described in Example I is repeated except for the following changes:

Dimethyl ether is substituted for methanol and since dimethyl ether is volatile at room temperature, it is introduced into reaction tower 4 via pipe 32. Pipe 32 enters tower 4 at a position 400 mm. above the lower end of the tower. The gas escaping via pipe 7 consists of methyl chloride and the total amount of unreacted dimethyl ether which was not condensed in dephlegmator 6. It is condensed and fractionated.

The dimethylpolysiloxane from the lower part of tower 4 is transferred to distillation unit 15 without prior separation of the water.

After operating for 12 hours the following material balance was obtained:

|  | Grams | Moles |
| --- | --- | --- |
| Reactants: |  |  |
| Dimethyldichlorosilane | 660 | 5.1 |
| Dimethyl ether | 633 | 13.7 |
| Mole ratio 1:2.7. |  |  |
| Reaction products: |  |  |
| Dihydroxydimethylpolysiloxane, yield: 91.6% of theoretical | 345 | 4.67 |
| Methyl chloride, yield: 85.4% of theoretical | 439 | 8.7 |

Although specific examples of the invention have been described herein, it is not intended to limit the invention solely thereto, but to include all variations and modifications falling within the scope of the appended claims.

The invention claimed is:

1. A method for preparing organopolysiloxanes and alkyl halides which comprises passing organohalosilanes and organic compounds having the general formula ROR' in which R is an alkyl radical having up to 4 carbon atoms and R' is selected from the group consisting of hydrogen, and alkyl and acyl radicals having up to 4 carbon atoms countercurrently through a reaction zone containing essentially inert and acid-resistant packing material which has a surface area of at least 0.1 m.$^2$/g. at a temperature of from 20° to 150° C.

2. The method of claim 1 in which an excess of the compound of the formula ROR' is constantly in contact with the packing material during the period in which the reactants are passed through the zone containing the packing material.

3. The method of claim 1 in which the packing material is a carbon based material.

4. The method of claim 1 in which the packing material is a granulated activated charcoal.

5. The method of claim 1 in which the zone containing the packing material is maintained at a temperature ranging from 50° to 100° C.

6. The method of claim 1 in which cyclic organopolysiloxanes are recycled through the reaction zone after being separated from the organopolysiloxane reaction mixture.

7. The method of claim 1 in which linear organopolysiloxanes are recycled through the reaction zone after being separated from the organopolysiloxane reaction mixture.

References Cited
UNITED STATES PATENTS

| | | | |
|---|---|---|---|
| 2,831,011 | 4/1958 | Sommer | 260—448.8 R |
| 2,832,794 | 4/1958 | Gordon | 260—448.2 E |
| 3,269,981 | 8/1966 | Goossens | 260—46.5 R |
| 3,595,896 | 7/1971 | Nitzsche et al. | 260—448.2 E |
| 3,646,093 | 2/1972 | Puthet | 260—448.2 E |

DANIEL E. WYMAN, Primary Examiner

P. F. SHAVER, Assistant Examiner

U.S. Cl. X.R.

260—46.5 R, 448.8 R